(12) United States Patent
Bowles et al.

(10) Patent No.: US 12,195,253 B1
(45) Date of Patent: Jan. 14, 2025

(54) SMART HYDRATION SYSTEM

(71) Applicant: Hyduro, Inc., La Jolla, CA (US)

(72) Inventors: Miles Bowles, La Jolla, CA (US); John L. Thompson, Cote de Cava, CA (US); Mark Bowles, Fredericksburg, TX (US); Thomas H. Lupfer, San Diego, CA (US)

(73) Assignee: Hyduro, Inc., La Jolla, CA (US)

( * ) Notice: Subject to any disclaimer, the term of this patent is extended or adjusted under 35 U.S.C. 154(b) by 416 days.

(21) Appl. No.: 17/549,864

(22) Filed: Dec. 14, 2021

Related U.S. Application Data

(60) Continuation-in-part of application No. 17/497,959, filed on Oct. 10, 2021, now Pat. No. 11,649,096, which is a continuation of application No. 16/930,813, filed on Jul. 16, 2020, now Pat. No. 11,142,380, which is a continuation of application No. 16/703,836, filed on Dec. 4, 2019, now Pat. No. 10,717,569, which is a division of application No. 15/727,636, filed on Oct. 9, 2017, now Pat. No. 10,501,246.

(60) Provisional application No. 63/129,602, filed on Dec. 23, 2020, provisional application No. 62/429,798, filed on Dec. 3, 2016, provisional application No. 62/405,949, filed on Oct. 9, 2016.

(51) Int. Cl.
| | |
|---|---|
| *B65D 51/24* | (2006.01) |
| *B65D 41/04* | (2006.01) |
| *B65D 51/28* | (2006.01) |

(52) U.S. Cl.
CPC ....... *B65D 51/248* (2013.01); *B65D 41/0492* (2013.01); *B65D 51/28* (2013.01)

(58) Field of Classification Search
CPC .... B65D 51/248; B65D 51/245; B65D 51/28; B65D 41/0492; A47G 23/16
USPC .......................................................... 222/27
See application file for complete search history.

(56) References Cited

U.S. PATENT DOCUMENTS

| | | | | |
|---|---|---|---|---|
| 4,842,723 | A * | 6/1989 | Parks | C02F 1/78 210/95 |
| 9,981,790 | B1 * | 5/2018 | Ost | B65D 51/248 |
| 10,078,003 | B2 * | 9/2018 | Gurumohan | G06Q 10/087 |
| 10,329,061 | B2 * | 6/2019 | Dias | B65D 51/245 |
| 11,559,081 | B2 * | 1/2023 | Blick | A61M 11/042 |
| 2007/0205203 | A1 * | 9/2007 | Temko | A47G 23/16 220/712 |
| 2010/0092309 | A1 * | 4/2010 | Hockemeier | F04B 43/084 417/472 |
| 2014/0324585 | A1 * | 10/2014 | Mederos | G06Q 30/0257 705/14.55 |
| 2014/0353339 | A1 * | 12/2014 | Madjar | A47G 19/2272 222/333 |
| 2016/0003615 | A1 * | 1/2016 | Biswas | G16H 20/60 702/151 |

(Continued)

*Primary Examiner* — Jeremy Carroll
(74) *Attorney, Agent, or Firm* — Clause Eight; Michael Catania

(57) ABSTRACT

A smart cap for use with a liquid container and a system therefor is disclosed herein. The components of the smart cap preferably comprise a micro motor, a microcontroller, a wireless transceiver (BTLE), a lithium ion battery, LED indicators, a waterproof rated charging port, a nozzle quick connect, a controllable valve, a touch sensor, a thermal sensor, a physical button, an impeller, and a cap housing.

6 Claims, 18 Drawing Sheets

(56) References Cited

U.S. PATENT DOCUMENTS

| | | | | |
|---|---|---|---|---|
| 2016/0025545 | A1* | 1/2016 | Saltzgiver | B65D 51/245 |
| | | | | 73/304 C |
| 2016/0031721 | A1* | 2/2016 | Kellam | C02F 1/42 |
| | | | | 210/244 |
| 2016/0286993 | A1* | 10/2016 | Pau | A47G 19/2288 |
| 2016/0327427 | A1* | 11/2016 | Briones | G16H 20/13 |
| 2017/0176238 | A1* | 6/2017 | Dubey | G01G 17/06 |
| 2017/0188730 | A1* | 7/2017 | Schuller | A47G 19/2272 |
| 2017/0188731 | A1* | 7/2017 | Schuller | A47G 21/18 |
| 2017/0263102 | A1* | 9/2017 | Tshilombo | G01F 22/00 |
| 2017/0273488 | A1* | 9/2017 | Lonis | A47G 23/16 |
| 2017/0332813 | A1* | 11/2017 | Liao | G01F 25/20 |
| 2017/0340147 | A1* | 11/2017 | Hambrock | A45F 3/16 |
| 2018/0078065 | A1* | 3/2018 | Cheatham | A47G 19/2227 |
| 2018/0132643 | A1* | 5/2018 | Shklar | G01F 23/266 |
| 2019/0282979 | A1* | 9/2019 | Noall | B65D 81/3222 |

* cited by examiner

SMART HYDRATION SYSTEM

CROSS REFERENCES TO RELATED APPLICATIONS

The Present Application claims priority to U.S. Provisional Patent Application No. 63/129,602, filed on Dec. 23, 2020, and is also a continuation-in-part application of U.S. patent application Ser. No. 17/497,959, filed on Oct. 10, 2021, which is a continuation application of U.S. patent application Ser. No. 16/930,813, filed on Jul. 16, 2020, now U.S. Pat. No. 11,142,380, issued on Oct. 12, 2021, which is a continuation application of U.S. patent application Ser. No. 16/703,836, filed on Dec. 4, 2019, now U.S. Pat. No. 10,717,569, issued on Jul. 21, 2020, which is a divisional application of U.S. patent application Ser. No. 15/727,636, filed on Oct. 9, 2017, now U.S. Pat. No. 10,501,246, issued on Dec. 10, 2019, which claims priority to U.S. Provisional Patent Application No. 62/405,949, filed Oct. 9, 2016, and U.S. Provisional Patent Application No. 62/429,798 filed on Dec. 3, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to hydration systems.

Description of the Related Art

The prior art discusses various hydration apparatuses.
U.S. Patent Publication Number 20030075573 is one.
U.S. Pat. No. 8,505,783 is another.
U.S. Pat. No. 7,063,243 is another.
U.S. Patent Publication Number 20150102058 is another.
PCT Publication Number WO2005007066 is yet another.
However, all of these devices fail to provide a universal smart cap for use with liquid containers.

BRIEF SUMMARY OF THE INVENTION

The present invention provides a universal smart cap for a liquid container.

One aspect of the present invention is a smart cap for a liquid container. The smart cap comprises a micro motor, a microcontroller, a wireless transceiver (BTLE), a lithium ion battery, a plurality of LED indicators, a waterproof rated charging port, a nozzle quick connect, a controllable valve, a touch sensor, a thermal sensor, a physical button, an impeller, and a cap housing.

Another aspect of the present invention is a smart cap for a liquid container. The smart cap comprises a rechargeable battery, a microcontroller (with wireless transceiver/BTLE), a centrifuge pump (micro motor and impeller), and a plurality of LED light indicators.

Yet another aspect of the present invention is a system for a smart cap for a liquid container. The system comprises a smart cap, a mobile application for a mobile device, and a liquid container. The smart cap is attached to the liquid container.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
FIG. 1 illustrates a liquid container.

The present invention is a smart cap for use with a liquid container. The components of the smart cap preferably comprise a micro motor, a microcontroller, a wireless transceiver (BTLE), a lithium ion battery, LED indicators, a waterproof rated charging port, a nozzle quick connect, a controllable valve, a touch sensor, a thermal sensor, a physical button, an impeller, and a cap housing.

In one embodiment, the cap comprises a rechargeable battery, a microcontroller (with wireless transceiver/BTLE), a centrifuge pump (micro motor and impeller), and LED light indicators. An option valve may also be included.

Another embodiment is a system for the smart cap preferably comes apart into several main components for easy cleaning and interchangeability (especially with the nozzle).

A preferred system is a four-piece system comprising an inner hose (possible filter accessory), a standard thread connect (piece that connects to water bottle) with inner hose inlet, a smart module with an impeller, and a nozzle.

Another embodiment of the system has a centrifuge impeller pump which doubles as a controllable valve by lowering a rubberized impeller into the intake opening of the centrifuge pump. The impeller can be lowered using manual mechanics, electric actuation, or back pressure from the fluid within the system.

Another embodiment is an all-in-one system (does not allow the user to take the system apart). One simple quick connect for the hose. The inner hose is still removable. The inner hose preferably has a pivoting joint that lets the angle be adjusted for use in a straight bottle of a flat bottle.

The smart cap of the present invention may be utilized with the hydration apparatus 100 of Bowles, U.S. Provisional Patent Application No. 62/405,949, filed on Oct. 9, 2016, for a Hydration Apparatus, which is hereby incorporated by reference in its entirety.

The smart cap preferably has an electric motor, impeller, rechargeable battery, controller board, a wireless transceiver, controllable open/shut valve, charging port, activation button. It may still dynamically rotate. The smart cap also has a male-ended quick-connect nozzle for easily attaching the hose.

The smart cap may include a rotary-type positive displacement pumps selected from the group comprising an impeller pump, a flexible impeller pump, a rotary lobe pump, a velocity pump, an impulse pump, a gravity pump, a root-type pump, a valveless pump, a centrifugal pump, a rotary vane pump, a flexible vane pump, a circumferential piston pump, a rotary gear pump, a gear pump, a screw pump, a liquid ring pump, a helical twisted roots pump, a peristaltic pump, and a progressive cavity pump.

Alternatively, the smart cap may include a reciprocating pump selected from the group comprising a piston pump, a diaphragm pump, a positive displacement pump, a plunger pump, a radial piston pump and a hydraulic pump.

The smart cap preferably has an attachable hard-covers for extra protection and personalization. The cover allows for its own set of accessories such as including a built-in spot to carry your mobile device, wallet, keys, snack, etc. A solar panel for charging of electric cap or mobile device is optional. The hard shell could also have areas to clip system to a utility vest or backpack.

A smart cap preferably has a removable reservoir for easy cleaning and replacement. It also allows for the possibility of providing different types of reservoir inserts. For example, a standard insert, an insulated insert, an infusion insert, an anti-slosh insert, a flavor-enhancing insert, etc.

The smart cap preferably has a stretchable hose to eliminate dreadful hose dangle. The hose will also have a wire that connects the cap to the hose nozzle allowing the smart cap to be controlled from a button on the nozzle while connected to the hose.

The smart cap is powered and uses electric motor to expel water.

The smart cap is preferably wirelessly controllable and connects via smartphone app to allow for control over settings and usage data.

The smart cap is preferably easy to clean, and it has a smart cleaning mode where cap runs motor backwards and forwards in bursts to remove unwanted buildup and clean cap internals. It works best when user puts soap water in system before activating smart cleansing mode. It is also dishwasher safe (it can be disassembled easily and the impeller can be removed for unblocking jams).

The smart cap preferably has a waterproof charging port. The charging port is waterproof allowing the smart cap to come with you wherever your adventures take you.

The smart cap preferably has a custom measured gulp (burst) size, which allows a user to fine-tune smart caps settings to have it deliver the perfect amount of water each time with absolute accuracy and precision. A user uses the smart cap to measure out precise volumes. Potential applications include: measuring liquids while camping, rationing water throughout a race or athletic event, tracking your daily consumption.

The smart cap preferably has an adaptive gulp size. It uses data feedback from your smartwatch or heart rate sensor to intelligently resize your gulp depending on your current respiratory state.

When your heart and respiratory rates are high, you are in the most need of water however you are breathing fast and hard. Our smart cap recognizes this and automatically adjusts your gulp size down to allow you to get a quick sip in between breaths. It also increases the rate at which it notifies you to drink so that you still get enough water to keep you going.

The smart cap preferably has liquid tracking. The smart cap will keep track of the amount of water you drink. A user uses a mobile app to keep track of the user's drinking habits so as to get better insight into the user's health. A user can compare drinking habits with other health metrics such as athletic performance, heart rate, respiratory rate, etc. A user can compare data anonymously against a large community of users to see where the user stacks up. Help advance public knowledge of how good drinking habits really do affect healthy living and performance. See a report on how much of an impact you've made on the environment by reducing consumption of plastic non reusable water bottles.

The smart cap preferably has a display. The readout display shows current daily water consumption, battery life, mode, settings, etc.

The smart cap alternatively has a modular nozzle. It incorporates a modular nozzle connect for personalizing nozzle styles and attaching hose.

The smart cap alternatively has an activation button bypass. When a hose is connected, a cap activation is switched from cap to hose nozzle. This will likely be done via wire connection or short signal wireless connection.

One embodiment is a water bottle cap with the all the previously mentioned components and a sensor that tracks the rotations of the motor/impeller and uses algorithms to convert that information into data on how much liquid the user has consumed. In other words, the cap as previously mentioned with a sensor for tracking the amount of liquid expelled.

The smart cap also preferably has rotational tracking of the motor.

The App features preferably comprise a hardware battery life, a daily goal tracking, a performance optimization, and a statistics view.

The statistics view preferably comprises performance comparisons, overall usage, environmental impacts, health impacts and charitable impacts.

The App settings preferably comprise layout & style, accessibility and integrations.

The hardware settings preferably comprise burst volume, Bluetooth connections, tracking sensors, LED brightness, touch sensitivity and LED indicator notifications.

The account settings preferably comprise privacy controls, cloud syncing, data collection, account info, community sharing and notifications.

The hardware controller preferably comprises adjust burst volume, smart volume adjustment (using heart rate monitor), and LED notifications.

A Blog preferably comprises performance, general health and wellness, charity news, environmental impacts and news, and technology.

A preferred embodiment of the present invention is a smart cap for a liquid container. The smart cap comprises a micro motor, a microcontroller, a wireless transceiver (BTLE), a lithium-ion battery, a plurality of LED indicators, a waterproof rated charging port, a nozzle quick-connect, a controllable valve, a touch sensor, a thermal sensor, a physical button, an impeller, and a cap housing.

In a more specific embodiment, the smart cap further comprises a pump. The pump is preferably a rotary-type positive displacement pump. The rotary-type positive displacement pumps is preferably selected from the group comprising an impeller pump, a flexible impeller pump, a rotary lobe pump, a velocity pump, an impulse pump, a gravity pump, a root-type pump, a valveless pump, a centrifugal pump, a rotary vane pump, a flexible vane pump, a circumferential piston pump, a rotary gear pump, a gear pump, a screw pump, a liquid ring pump, a helical twisted roots pump, a peristaltic pump, and a progressive cavity pump.

Alternatively, the pump is a reciprocating pump. The reciprocating pump is preferably selected from the group comprising a piston pump, a diaphragm pump, a positive displacement pump, a plunger pump, a radial piston pump and a hydraulic pump.

The smart cap further comprises an attachable hard-cover for extra protection and personalization. The smart cap further comprises a removable reservoir for easy cleaning and replacement. The smart cap further comprises a stretchable hose. The smart cap further comprises an adaptive gulp size.

An alternative embodiment of the present invention is a smart cap for a liquid container. The smart cap comprises a rechargeable battery, a microcontroller (with wireless transceiver/BTLE), a centrifuge pump (micro motor and impeller), and a plurality of LED light indicators.

Yet another alternative embodiment of the present invention is a system for a smart cap for a liquid container. The system comprises a smart cap, a mobile application for a mobile device, and a liquid container. The smart cap is attached to the liquid container.

The mobile application preferably comprises a hardware battery life, a daily goal tracking, a performance optimization, and a statistics view. A plurality of hardware settings comprise burst volume, Bluetooth connections, tracking sensors, LED brightness, touch sensitivity and LED indicator notifications.

As previously stated, U.S. Provisional Patent Application No. 62/405,949, filed Oct. 9, 2016, is hereby incorporated by reference in its entirety.

Another embodiment is a cap for a liquid container that consists of the following components. An electric motor to actively expel liquid from within the container. A microcontroller with BTLE for syncing with companion mobile app and sharing liquid consumption data. Liquid consumption data is determined by power supplied to motor; threading is sized to fit most standard wide mouth bottles. A Hall effect sensor is used to switch on and off activation button. When valve is open, activation button is in on state. When toggle valve is shut, activation button is in off state. This prevents motor from pumping while valve is shut. An open/shut valve for prevents liquid spills. An air inlet allows liquid to flow without generating a vacuum within the container. A pressure sensitive activation button for providing dynamic control over the flow rate. The more force applied the higher the flow rate. A pump is positioned at the lower end of the hose to allow for self-priming. An indicator light transmits information.

A secondary flow rate meter for liquid consumption tracking is optionally provided. The secondary meter may be a piston meter, a rotary piston meter, an oval gear meter, a gear meter, a helical gear meter, a nutating disk meter, a variable area meter, a turbine flow meter, a Woltman meter, a single jet meter, a multiple jet meter, a paddle wheel meter, a Pelton wheel meter, a current meter, a Venturi meter, an orifice plate meter, a Dall tube meter, a Pitot-tube meter, a multi-hole pressure probe, a cone meter, a linear resistance meter, an optical flow meter, a laser-based optical flow meter, a level to flow meter (bubbler, ultrasonic, float, a differential pressure), an area velocity (Doppler or Propeller), a vortex flow meter, a sonar flow meter, an electromagnetic flow meter, an ultrasonic flow meter, a magnetic flow meter, a Coriolis flow meter, or a laser Doppler flow meter.

Figure 1A:
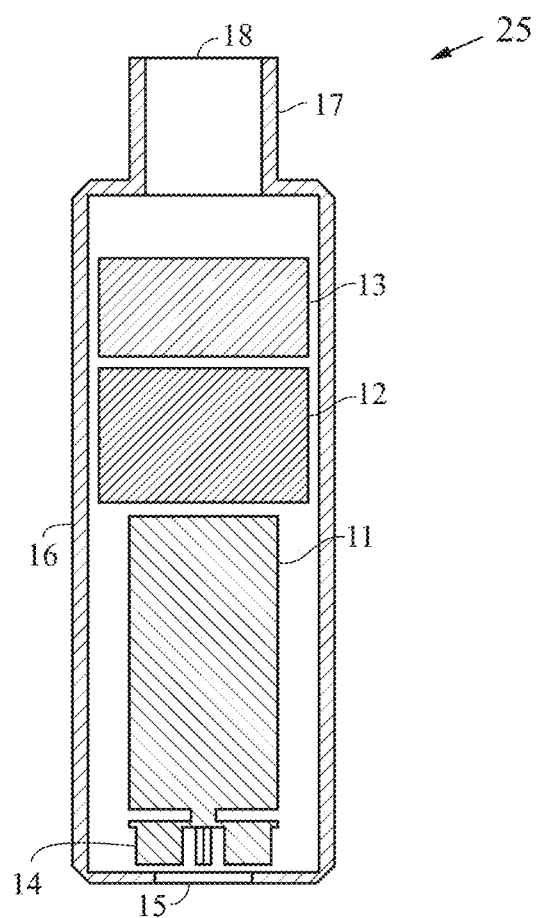
FIG. 1A is a cross-sectional view of the liquid container of FIG. 1.

As shown in FIGS. 1 and 1A, a liquid container 25 has an electric motor 11, a first module 12, a second module 13, an impeller 14, a water inlet 15, a motor & module housing 16, a hose connect 17 and a water outlet 18.

Figure 2:
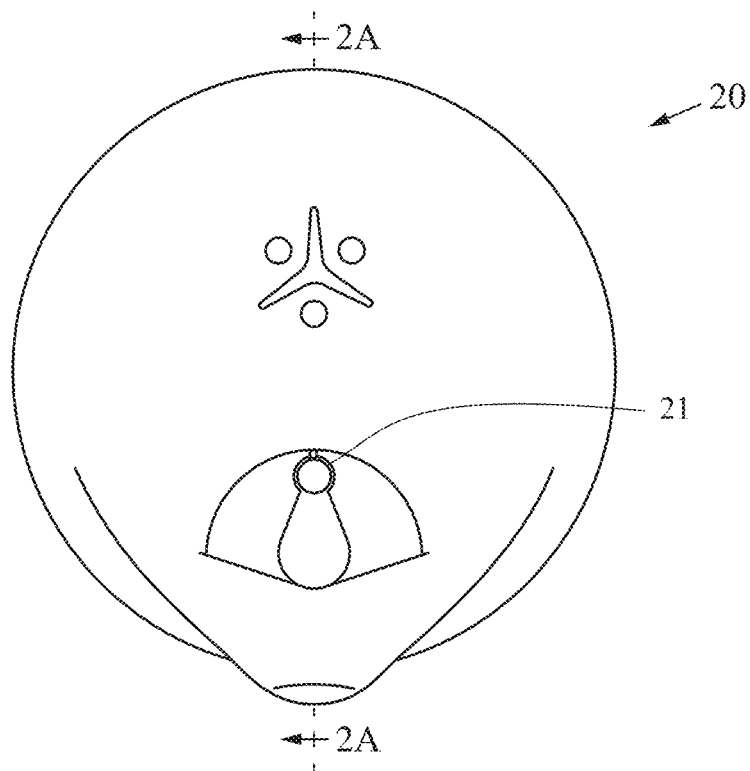
FIG. 2 illustrates a smart cap.
Figure 2A:
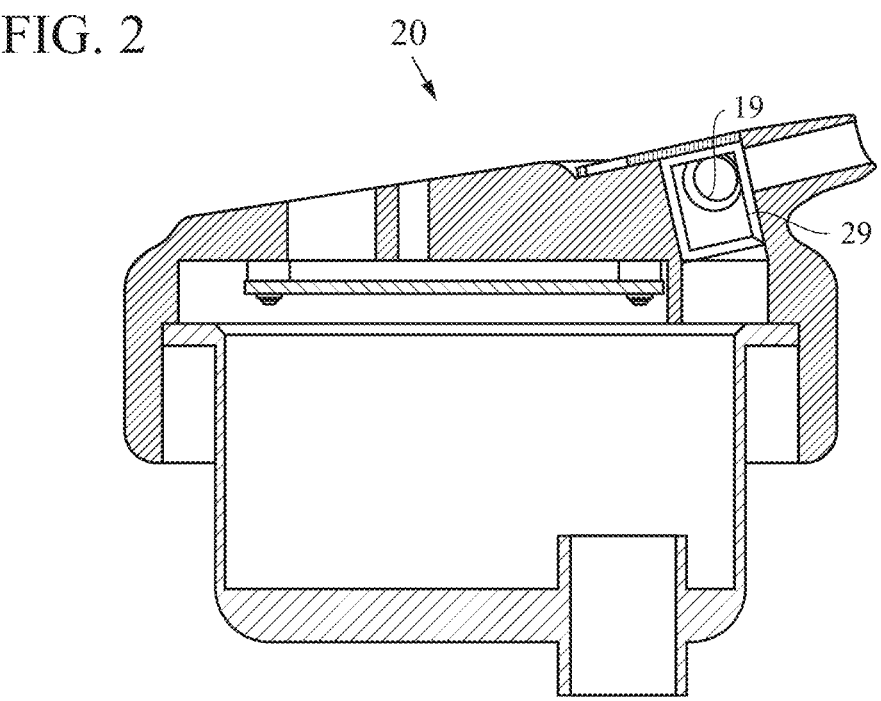
FIG. 2A is a cross-sectional view of the smart cap of FIG. 2.

FIGS. 2 and 2A illustrate a rotational valve open state 19, a rotational valve closed state 29 and a rotational valve lever arm 21.

Figure 3:
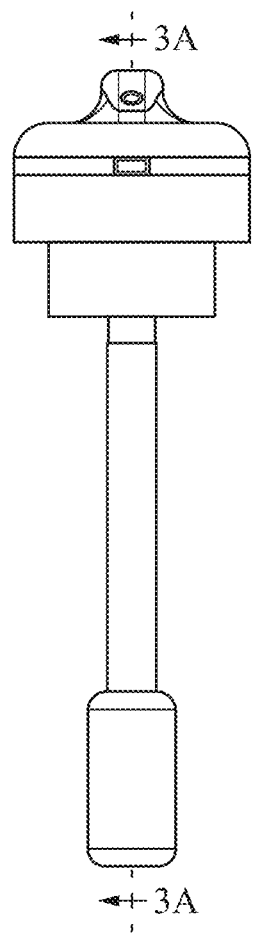
FIG. 3 illustrates a smart cap with a stem.
Figure 3A:
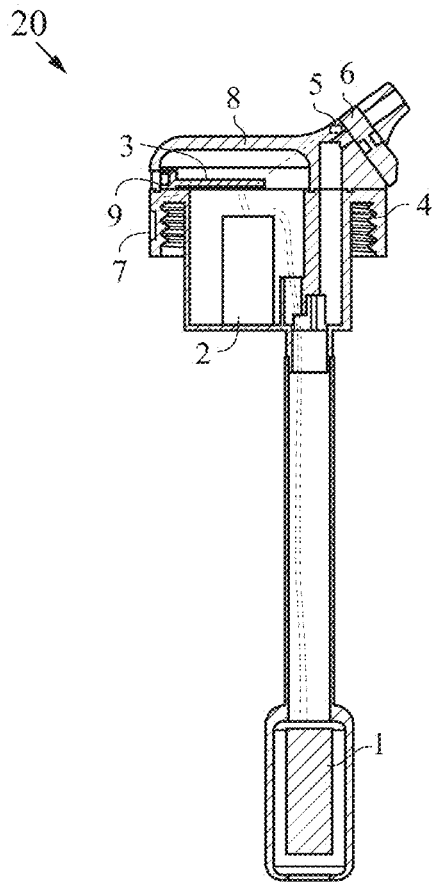
FIG. 3A is a cross-sectional view of the smart cap of FIG. 3.
Figure 3B:
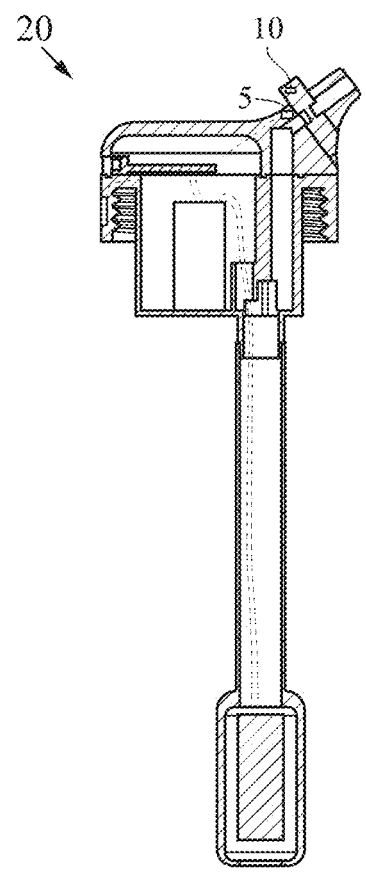
FIG. 3B is a cross-sectional view of the smart cap of FIG. 3.
Figure 6:
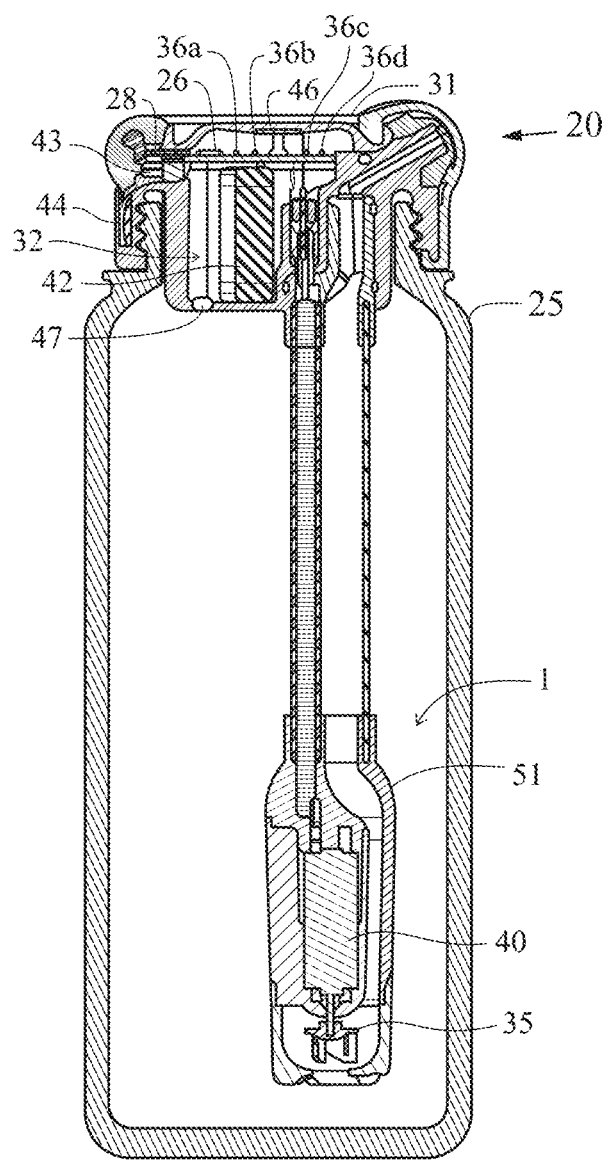
FIG. 6 illustrates a cross sectional view of a smart cap on a liquid container.
Figure 7:
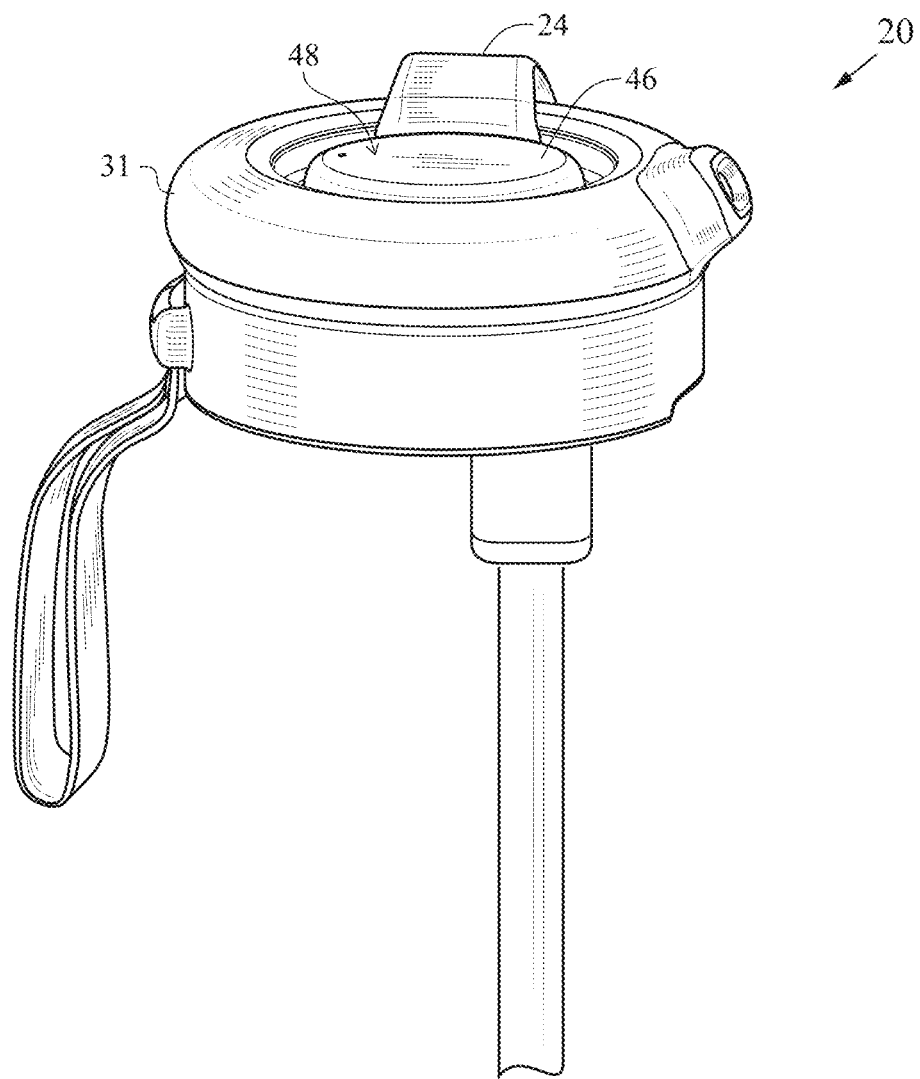
FIG. 7 is a top perspective view of a smart cap with a stem.
Figure 8:
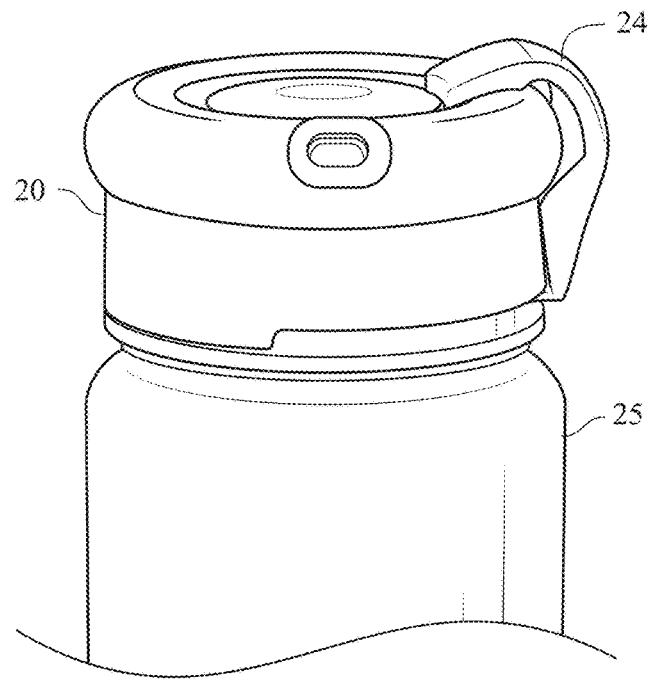
FIG. 8 is a component of a smart hydration system.
Figure 9:
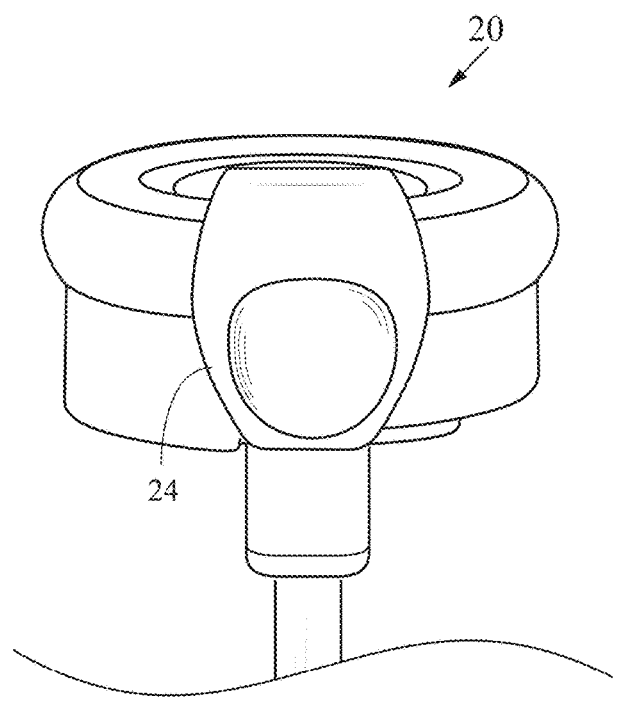
FIG. 9 is a component of a smart hydration system.

FIGS. 3, 3A (closed) and 3B (open) illustrate an embodiment of a smart cap 20 with an electric motor pump 1, a rechargeable battery 2, a circuit board 3, threading 4, a Hall effect sensor 5, a toggle valve 6, a switch or pressure sensor 7, an indicator light 8, a charging port 9, an embedded magnet 10 (for activation of hall effect sensor 5). As shown in FIG. 6, a smart cap 20 has a cap housing 31, a touch sensor 46, a waterproof rated charging port 43, a physical button 44, a lithium ion battery 42, a thermal sensor 47, a removable reservoir 32, LED indicators 36a-d, a BTLE transceiver 28, a centrifugal pump 51, a micro-motor 40 and an impeller 35. As shown in FIG. 7, a smart cap 20 has a cap housing 31, a touch sensor 46, a light indicator area 48, and an attachable hard-cover 24.

Figure 4:
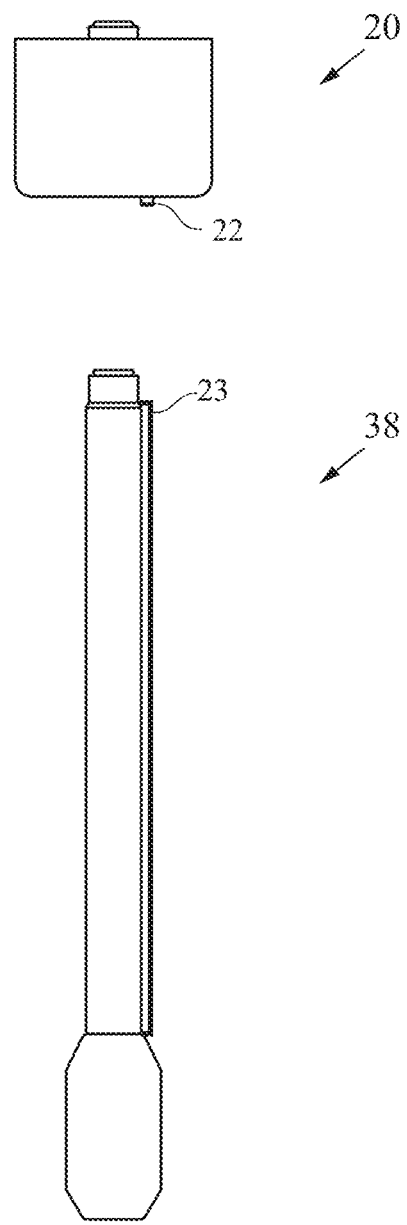
FIG. 4 illustrates a water-tight electrical connection.

A detachable downstem 38, as shown in FIG. 4, has a watertight electrical connection 23 that connects to a smart cap's 20 electrical connection 22. This allows for different size downstems to be used with the same cap unit. This smart connector can be used for other accessories including but not limited to: a heating element, a powered mixer (for mixing protein shakes and nutritional supplements), a UV light purifier, a filter, an infuser and a hydrogen water generator.

FIG. 4 illustrates a water-tight electrical connection (Smart cap receiving end) 22 and a water-tight electrical connection (downstem end) 23.

Figure 5:
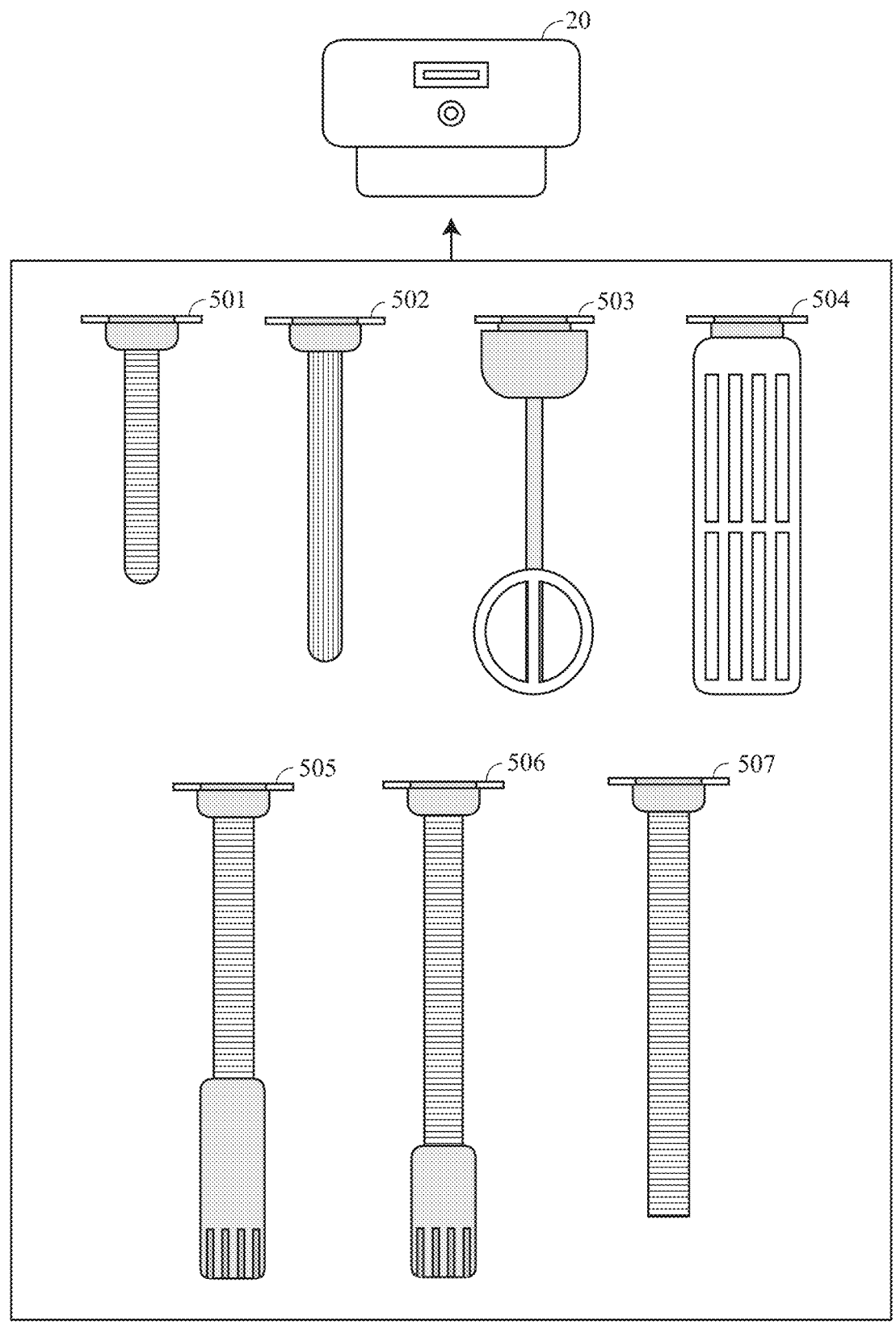
FIG. 5 illustrates a smart cap and inline modules.

As shown in FIG. 5, an inline module, selected from a UV purifier inline module 501, a heater inline module 502, a mixer inline module 503, an infuser inline module 504, a pump inline module 505, a filter inline module 506 and a simple hose inline module 507, is a replaceable insert that can be used with a smart cap 20 for: Filtering; UV light purification; Making water more alkaline; Mineral infusion; Flavor infusion; Vitamin & supplement infusion; and/or Hydrogen water generator.

Figure 10:
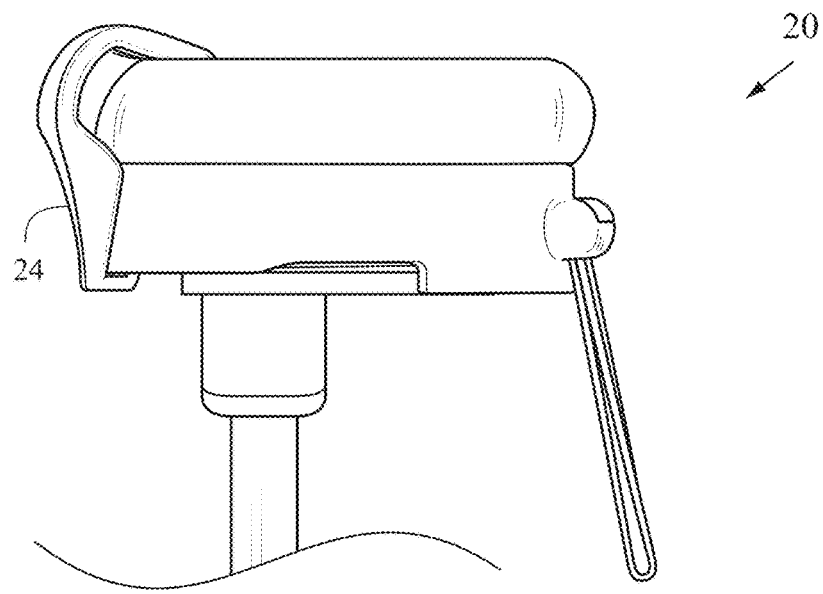
FIG. 10 is a component of a smart hydration system.
Figure 11:
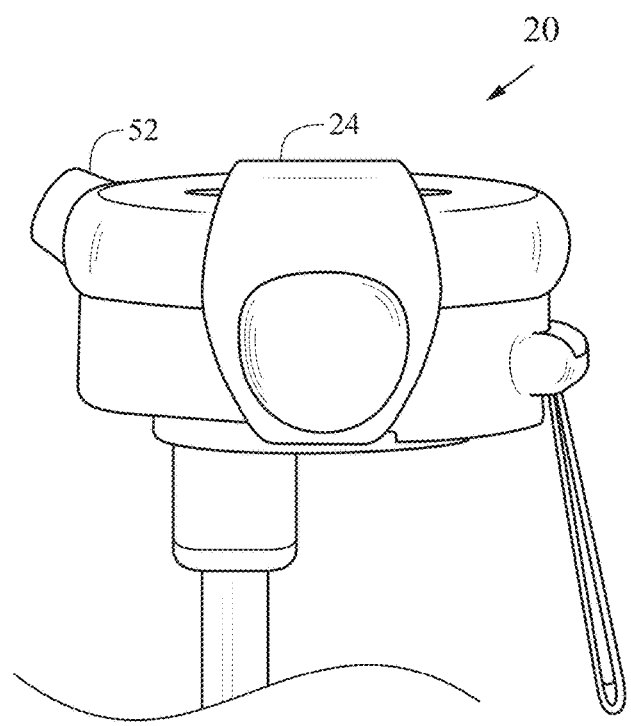
FIG. 11 is a component of a smart hydration system.
Figure 12:
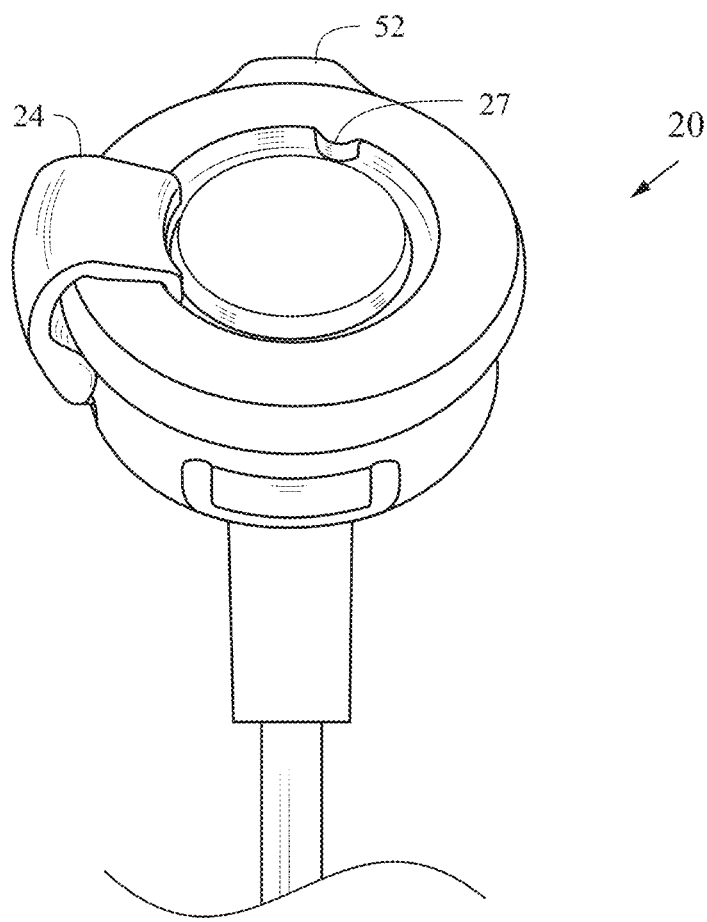
FIG. 12 is a component of a smart hydration system.
Figure 13:
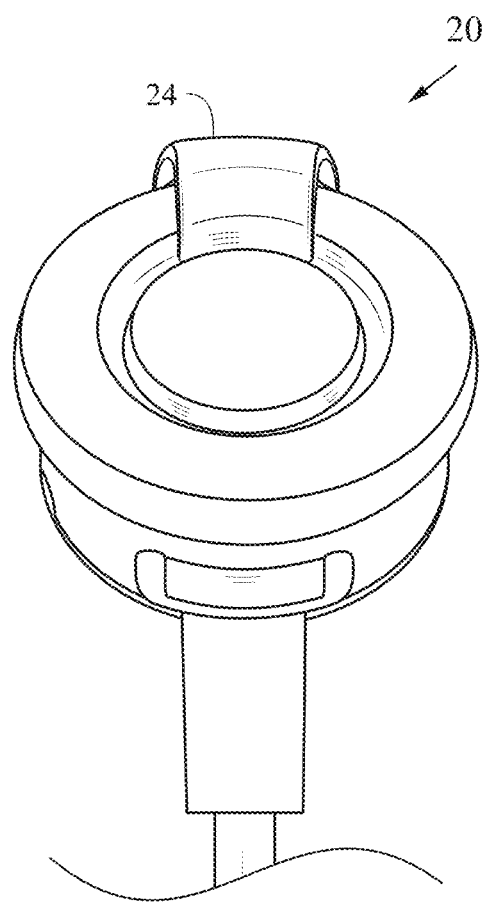
FIG. 13 is a component of a smart hydration system.

FIGS. 8-13 illustrate an attachable hard-cover 24, shown as a slider. The slider seals the nozzle 52 and air inlet 27, and prevents debris from getting on nozzle 52 or into the liquid container 25. When the slider is in the sealed position, as shown in FIG. 10, it is secured between the cap and container. When the slider is in the open position, as shown in FIG. 11 and FIG. 12, the slider can be easily removed and the air inlet is opened. The air inlet 27 is sealed when the slider is in the closed position, as shown in FIG. 13.

Figure 14:
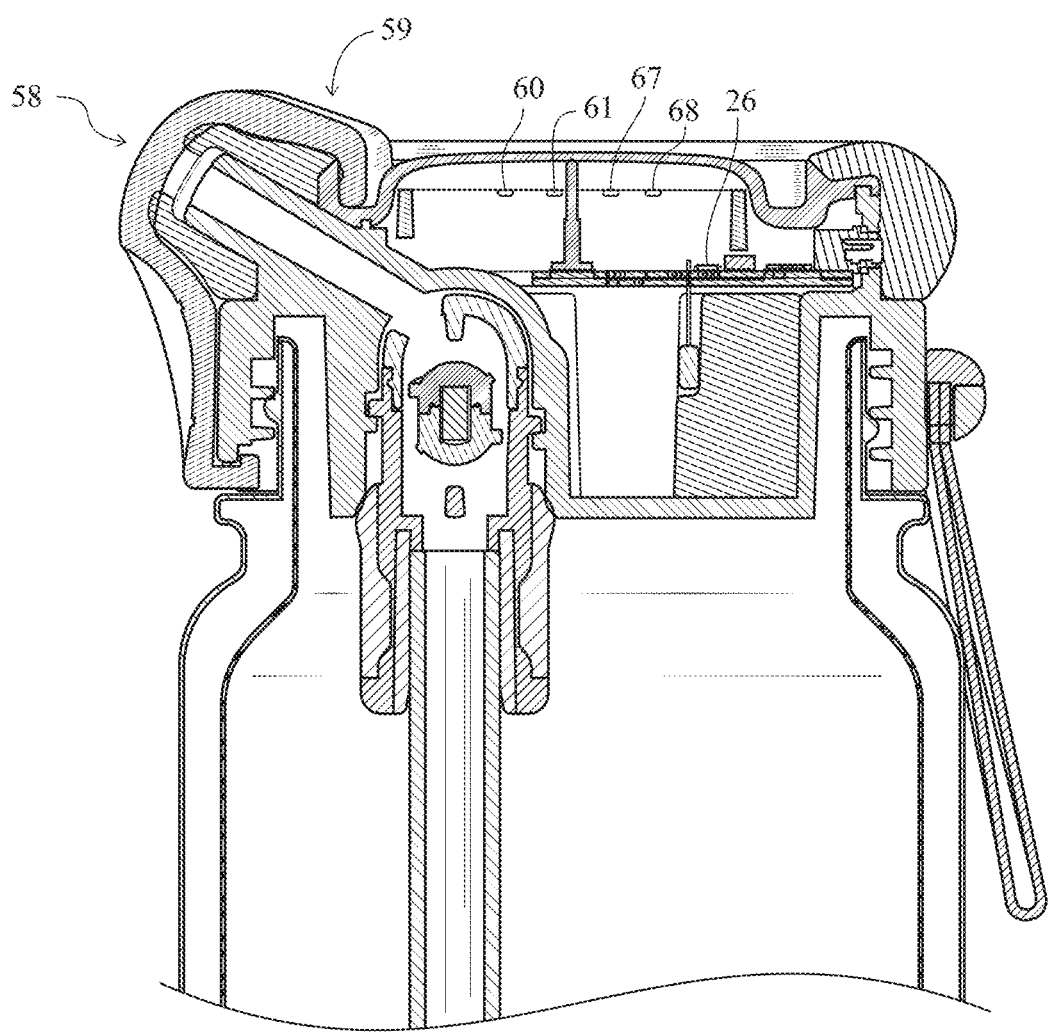
FIG. 14 illustrates a cross sectional view of components of a smart hydration system.
Figure 15:
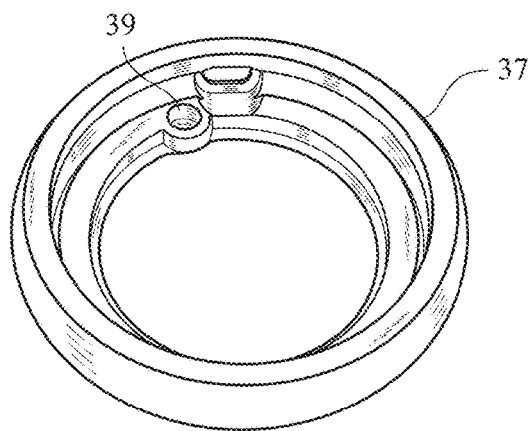
FIG. 15 is a component of a smart hydration system.
Figure 16:
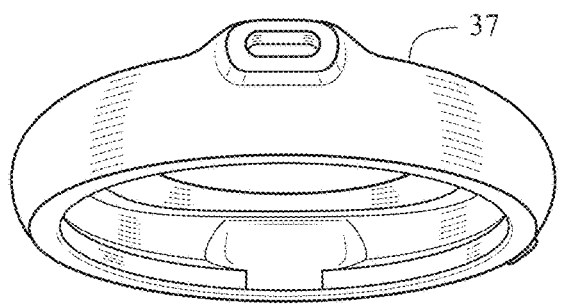
FIG. 16 is a component of a smart hydration system.
Figure 17:
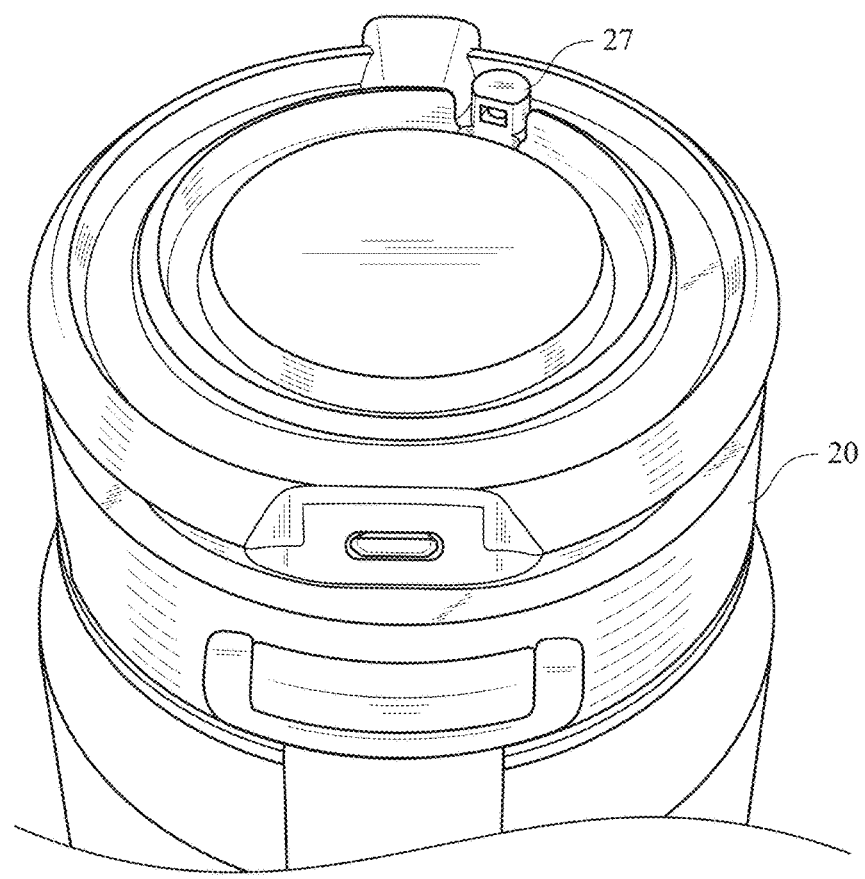
FIG. 17 is a component of a smart hydration system.
Figure 18:
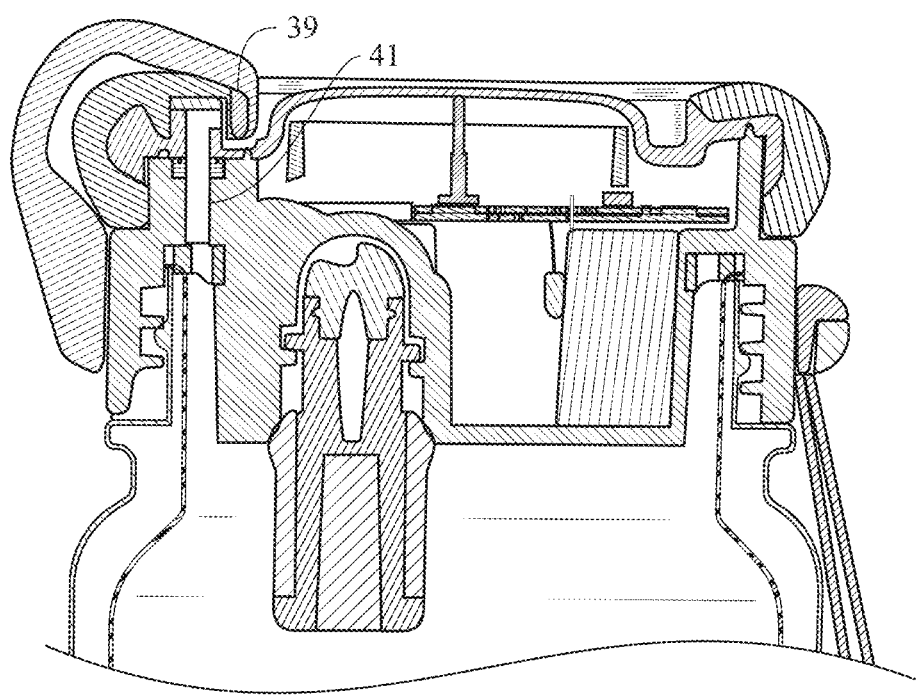
FIG. 18 illustrates a cross sectional view of components of a smart hydration system.
Figure 19:
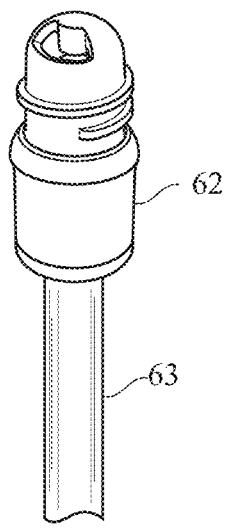
FIG. 19 is a component of a smart hydration system.
Figure 20:
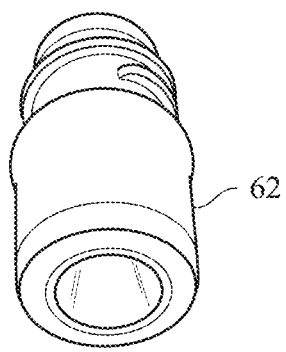
FIG. 20 is a component of a smart hydration system.
Figure 22:
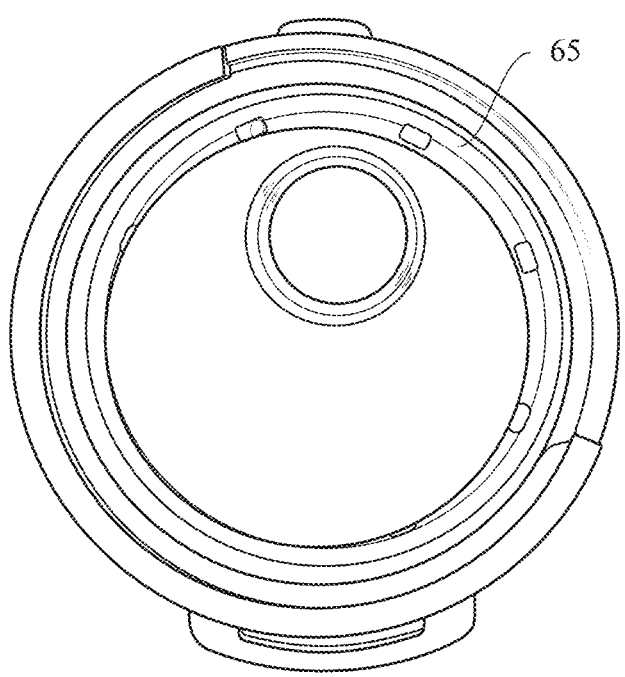
FIG. 22 is a component of a smart hydration system.
Figure 23:
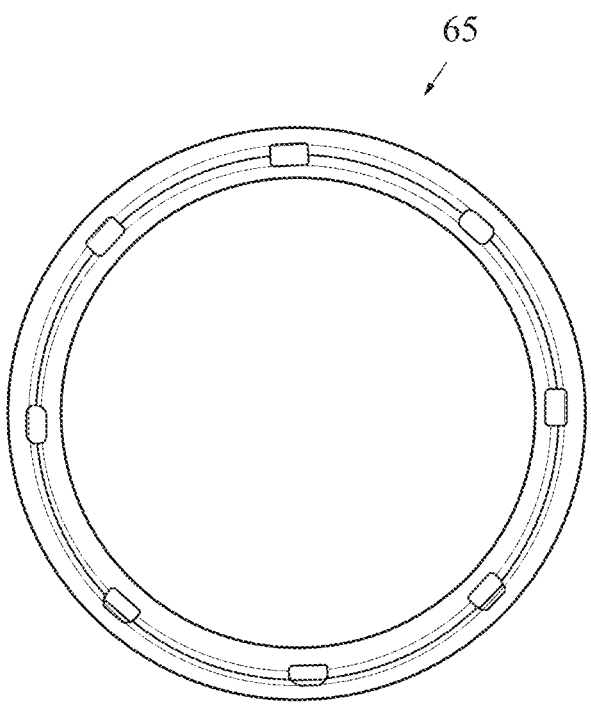
FIG. 23 is a component of a smart hydration system.
Figure 24:
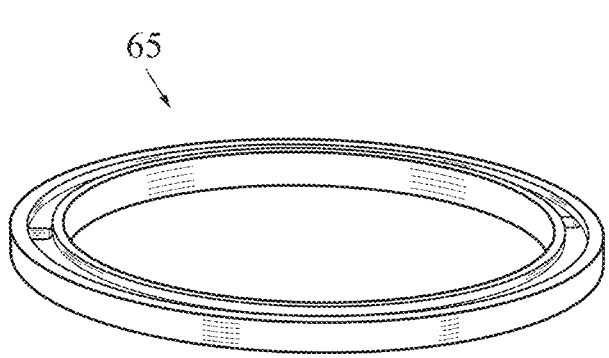
FIG. 24 is a component of a smart hydration system.

FIG. 14 illustrates a nozzle seal 58 and an air-inlet seal 59. The seal is achieved by the air inlet cover/sealing interface 39 on the bumper 37, as shown in FIGS. 15 and 16. Seal is made by the slider compressing the bumper component into the air-inlet opening. This design leverages opposing forces from compression made on nozzle and air-inlet to provide a secure seal. FIG. 17 shows the air inlet 27 of the cap with the bumper removed. FIG. 18 illustrates an air-inlet sealing interface 39 and an air-inlet channel 41. FIGS. 19-20 illustrate a straw coupling 62 that allows for different length straws 63. FIGS. 22-24 illustrate a gasket 65 with vents and channel to allow air flow from the air-inlet without the gasket 65 having to be aligned in a specific position.

Flowmeter

One embodiment is a flowmeter 55. A flowmeter allows the smart hydration system to monitor the volume of liquid that goes through the system. This is used to capture the user's drink consumption data in the form of a drink log.

A cap for a liquid container comprised of but not limited to: Flowmeter; Microcontroller; Battery. The flowmeter sensor is embedded within the flow path of the straw/nozzle. The flowmeter sensor is connected to the microcontroller.

Figure 21:
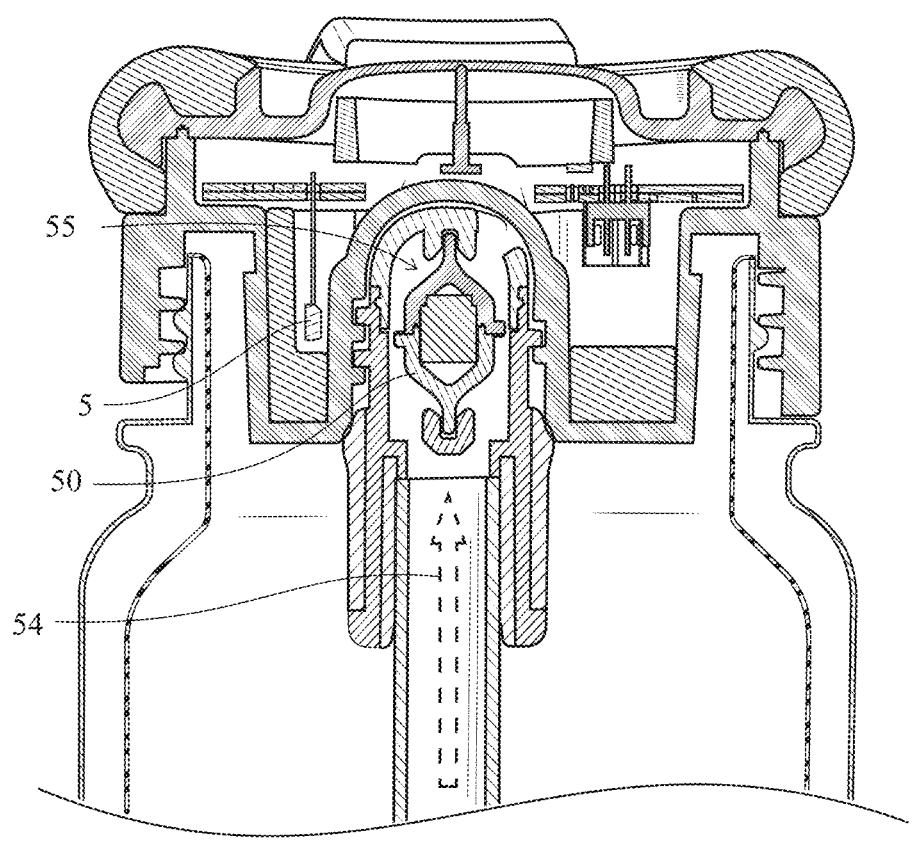
FIG. 21 illustrates a cross sectional view of components of a smart hydration system.

An embodiment of the invention described in Embodiment A is shown in FIG. 21, utilizing a flowmeter 55 comprising a magnetic rotor 50 with hall effect sensor 5. Where the magnetic rotor 50 sits within the flow path 54 and rotates when liquid passes across it. The Hall effect sensor 5 is located on the same plane as the magnetic rotor 50 and is positioned outside of the liquid flow path 54. The Hall effect sensor 5 detects the magnetic field oscillations created by the spinning rotor 50 allowing the microcontroller 26 to compute the rotation count and speed (revolutions/time) which can be used to calculate the volume of liquid that has passed through the flowmeter 55. (See Flowmeter Algorithm for more detail).

An embodiment of the invention described in Embodiment A utilizing a flowmeter comprising a 1-axis piezoelectric flex sensor. Where the flex sensor is embedded within the liquid flow path such that when liquid passes by, it deflects the flex sensor in the direction of the liquid flow. The degree of deflection combined with the duration of the deflection are used to determine the volume of liquid that has passed through the flowmeter. Also, it should be noted that this flowmeter invention is not limited to liquid but instead could be used for any fluid so as to include gases. This permits this flowmeter to be used in the Respiratory Monitoring Mask invention described below in this document.

An embodiment of the invention described in Embodiment A utilizing a flowmeter comprising a laser emitter element and an optical sensor/receiver. Where the laser path is oriented perpendicular to and directly through the liquid flow path and the optical sensor/receiver is positioned on the opposite side of the liquid flow path across from the laser emitting element. The degree of the laser diffusion combined with the duration of the diffusion is used to determine the volume of liquid that has passed through the flowmeter.

There are many different types of flowmeters including but not limited to: Electromagnetic Flowmeter; Ultrasonic Flowmeter; Coriolis Flowmeter; Displacement Flowmeter; Piezoelectric Flex Sensor Flowmeter; Laser and Optical Sensor Flowmeter; Water Optimized Vortex Shedders Flowmeter; Lubrication Optimized Vane/Piston Style Flowmeter; Water Optimized Vane/Piston Style Flowmeter; Variable Area Float Flowmeter; Paddle Wheel Flowmeter; Laminar Flow Element Flowmeter; Thermal Flowmeter; Differential Pressure; Positive Displacement Flowmeter; Propeller Flowmeter; Turbine Flowmeter; and Magnetic rotor with hall effect sensor.

Fluid Analysis

Fluid analysis is the ability to analyze the characteristics of a fluid could be useful to automatically determine the drink type in order to provide richer data for the hydration algorithm and allow for automatic drink log categorization. Data obtained from liquid sensors can also be used to generate a personalized enrichment profile. The embodiments below are intended to cover the use of any specific liquid analysis sensor or any combination of liquid analysis sensors.

An embodiment of the cap system with an embedded optical sensor 60 located on the bottom side of the cap facing the interior of the bottle, as shown in FIG. 14. The optical sensor can be controlled and interpreted via the systems microcontroller 26 and software application.

An embodiment of the bottle system or wearable system with an embedded optical sensor located within the interior of the vessel. The optical sensor can be controlled and interpreted via the systems microcontroller and software application.

An embodiment of the cap system with an embedded PH sensor 61 located on the bottom side of the cap facing the interior of the bottle is shown in FIG. 14. The PH sensor 61 can be controlled and interpreted via the systems microcontroller 26 and software application.

An embodiment of the bottle system or wearable system with an embedded PH sensor located within the interior of the vessel. The PH sensor can be controlled and interpreted via the systems microcontroller and software application.

An embodiment of the cap system with an embedded electromagnetic sensor 67 located on the bottom side of the cap facing the interior of the bottle is also shown in FIG. 14. The electromagnetic sensor 67 can be controlled and interpreted via the systems microcontroller 26 and software application.

An embodiment of the bottle system or wearable system with an embedded electromagnetic sensor located within the interior of the vessel. The electromagnetic sensor can be controlled and interpreted via the systems microcontroller and software application.

Liquid characteristics of interest include but are not limited to: turbidity; Electromagnetic; PH; Conductivity; Color; Viscosity; Water Hardness; Compressibility; Volume; Density; Temperature; Buoyancy; Surface Tension; Surface Appearance; Appearance; and Sound Propagation.

Liquid analysis sensors include but are not limited to: Optical Sensor/Camera; Laser Sensor; Capacitive Sensor; PH Sensor; Electromagnetic Sensor; Liquid Float Sensor; Audio Sensor; and Flow Sensor.

Pump System

A pump system can be used to deliver liquid to the user without the user needing to draw/suck from the straw or tip the bottle upwards. A pump can also be used to track liquid consumption by monitoring power input into the pump system. The pump can also be used in conjunction with a filter element to remove contaminants from the fluid.

An embodiment of the bottle system or wearable system with an embedded micro blower pump used to store pressure within the fluid container. The actuator would trigger the release valve to allow fluid to be expelled via displacement from the bottle. The actuator can be either electrically or mechanically driven, consisting of: Micro blower pump; Battery; Capacitive charger (Optional); One-way valve; Internal pressure sensor (Optional); Actuator; and Release valve (Can be either a binary state or variable state release valve).

Another embodiment uses a button to trigger a diaphragm pump to displace fluid from within the fluid vessel through the drinking nozzle. This embodiment does not require a release valve at the location where the fluid is expelled (the nozzle). Also, this embodiment does not deal with a stored pressure which may reduce the engineering burden and system complexity. This embodiment consists of: a diaphragm pump; Battery; Capacitive charger (Optional); One-way valve; pressure sensor; and an actuator.

Ultraviolet Purification & Sanitization

Ultraviolet (UV) light is known to kill bacteria. When UV light is directed at a surface with sufficient intensity, it can sanitize the surface by killing much of the bacteria present. UV light can also be directed into a body of liquid to purify the liquid of live bacteria. The degree of sanitization/purification is dependent on the ultraviolet light saturation and intensity.

An embodiment of the cap system with an embedded ultraviolet light emitter 68 located on the bottom side of the cap facing the interior of the bottle is shown in FIG. 14. The UV light emitter 68 can be controlled via the systems microcontroller 26 and software application. (See System Architecture & Processes).

An embodiment of the bottle system with an embedded UV light emitter located within the interior of the vessel. The UV light emitter can be controlled via the systems microcontroller and software application. (See System Architecture & Processes).

An embodiment of the cap system with an embedded ultraviolet light emitter located somewhere along the fluid flow path. The UV light emitter can be controlled via the systems microcontroller and software application. (See System Architecture & Processes). In this embodiment the UV light can be focused with greater intensity on a smaller volumetric area along the flow path allowing for a faster rate of purification. The advantage of this is that the UV light emitter can be dynamically turned on based on when fluid is actively flowing through the system.

This could improve many aspects of the overall system such as but not limited to: The liquid purification level; User experience, the user would not need to initiate the purification process because the system would be able to initiate the process automatically when the user is drinking or when fluid is flowing through the system (See UV for more detail), and the user would have a lower risk of unsafe exposure to UV light because the light would be isolated to a contained area within the flow path of the smart hydration system; System battery life, the battery life could be improved because of a potentially lower power requirement from the UV light emitter and automatic power on/off mode. (See System Architecture & Processes). The potential downside to this embodiment is that the surface on the interior of the bottle would not be sanitized. The result being that the interior of the bottle would build up a layer of bacteria causing it to smell faster and require cleaning more frequently.

An embodiment of the invention described in Embodiment C with the addition of a second UV light emitter located on the bottom side of the cap facing the interior of the bottle. This embodiment addresses the lack of bottle sanitization noted in the previous embodiment.

Digital Display & Touch Input

The addition of a digital display and/or touch input element to the smart hydration system could improve the invention by allowing for more advanced interactivity with the device and richer feedback from the device.

The digital display and/or touch input element can be used for but is not limited to: waking up the device via touch detection; Displaying and allowing the user to respond to notifications and messages such as but not limited to Hydration reminders and Warnings for a Low battery or Over hydrating; Inputting information such as but not limited to Drink consumption, Caffeine consumption, Alcohol consumption and Workouts/activities; Displaying detailed information such as but not limited to Hydration status, Device settings, Device status, Battery level and Connectivity; and Adjusting user preferences/settings such as but not limited to a Brightness level, Wake/sleep time, Disable/enable notifications, Change device modes and Connectivity.

An embodiment of the smart hydration system where the light indicator area 48 on the cap system, as shown in FIG. 7, is replaced by or used in conjunction with a digital display and/or touch input element. The digital display can utilize but is not limited to any of the following technologies: LCD; LED; OLED; and E-Ink.

An embodiment of the smart hydration system where the bottle system is equipped with an embedded digital display and/or touch input element. This embodiment could utilize a flexible display technology to allow the display to wrap around a cylindrical bottle. The digital display can utilize but is not limited to any of the following technologies: LCD; LED; OLED; and E-Ink.

Speech Recognition And Voice Commands

The ability to recognize and respond to voice commands could improve the user experience by allowing more methods for controlling and inputting data into the smart hydration system.

An embodiment of the smart hydration system where the bottle system is equipped with an embedded microphone that is connected to the systems microcontroller. The system is programmed with specific wake word commands that can be used to control and input information.

An embodiment of the smart hydration system where the cap system is equipped with an embedded microphone that is connected to the systems microcontroller. The system is programmed with specific wake word commands that can be used to control and input information.

An embodiment of the smart hydration system where the companion device is equipped with an embedded microphone that can be accessed by the software application. The system is programmed with specific voice commands that can be used to control and input information.

Voice command examples: "Hey PÜL, add 8 ounces of water to my drink log"; "Hey PÜL, what is my hydration status?". These are only intended to demonstrate some of the potential functionality of the feature and do not represent the actual implementation of the feature.

Liquid Filtering

A filter can remove contaminants from the liquid such as but not limited to: Chemicals such as Organic Chemicals, Volatile Organic Compounds (VOCs) and Inorganic Chemicals including Herbicides, Pesticides, Hormones and Toxins; Biological substances including Bacteria, Viruses, Parasites and Cysts; Radiological substances such as Heavy metals; and Physical such as Sediment and Particles.

An embodiment of the smart hydration system with a filtration element placed within the flow path such that when liquid passes through the flow path, it is forced through the filter element.

An embodiment of the smart hydration system with a filter element that is located within the reservoir.

Filtration types/methods include: Reverse osmosis (RO); Sediment; Activated Carbon Block (ACB); Granular Activated Carbon (GAC); Distillation; Ion-Exchange (IX); Ultraviolet (UV); Ultrafiltration (UF); Activated Alumina (AA); and Ionization.

Liquid Enrichment

Consumable liquids can be enriched to enhance qualities such as but not limited to: Flavor; PH level; Electrolyte content; Caffeine content; Protein/amino acid content; and Vitamin & mineral content. Liquid enrichment can also come in the form of supplement complexes to support areas such as but not limited to: Cognitive performance; Energy; Sleep; Anti-inflammation; Muscle recovery; and Joint & ligament support.

An embodiment of the smart hydration system with the addition of a reservoir containing an enrichment substance is located perpendicular to the flow path. The reservoir containing the enrichment substance has a through-hole containing a one-way valve that allows flow from the exterior of the reservoir into the interior of the reservoir. A second through-hole containing a one-way valve connects the reservoir containing the enrichment substance to the interior of the flow path allowing the enrichment substance to flow from the reservoir into the flow path. This embodiment utilizes the Venturi effect to pull the enrichment substance from the reservoir into the flow path. When liquid is moving through the flow path it creates an area of low pressure within the flow path. The Venturi effect causes the enrichment concentrate to move from the relative high pressure area of the reservoir to the relative low pressure area of the connected flow path.

There are several notable advantages of this embodiment: It does not impede the flow of liquid through the flow path; It allows the enrichment substance to last longer because it only mixes with the fluid that is actively moving through the flow path; It allows the reservoir containing the main fluid body (bottle system or wearable system) to remain clean longer because the enrichment substance does not mix freely with the main fluid body outside of the flow path; and It could improve the user experience by allowing the enrichment substance to mix automatically when user drinks without requiring the user to apply manual input. This embodiment both encompasses and is compatible with the embodiment of the cap system that is equipped with a pump.

An embodiment of the smart hydration system with the addition of a reservoir or container containing an enrichment substance wherein the enrichment substance can passively diffuse into the liquid.

An embodiment of the smart hydration system with the addition of a reservoir or container containing an enrichment substance wherein the enrichment substance can be manually introduced into the liquid by the user via an actuator.

All of the embodiments regarding liquid enrichment are primarily describing a modular system or refillable system where the enrichment substance would be stored in a consumable and replaceable module, or where the enrichment substance could be replenished or refilled. However, this should not rule out variations of the system that utilize a permanent enrichment source.

Accessory Attachments

The ability to easily attach accessories to the smart hydration system allows for the expansion of the systems functionality.

An embodiment of the smart hydration system where the straw (if applicable) is equipped with a connector feature wherein accessories can be attached.

An embodiment of the smart hydration system where the cap system (if applicable) is equipped with a connector feature wherein accessories can be attached.

An embodiment of the smart hydration system where the bottle system (if applicable) is equipped with a connector feature wherein accessories can be attached.

Accessories can include but are not limited to: Fruit infuser; UV light emitter; Modules containing an enrichment substance; Filtration element; Pump; Carry handle; Scented element; Antimicrobial element; Fluid analysis element; and a Smart scale.

Scented Accessories

Smell can improve the user experience of drinking from the smart hydration system. An embodiment of the smart hydration system where a scented additive is used in the material of a component or various components of the system. An embodiment of the cap system where the rubber bumper component (if applicable) has a scented additive in the material. Strong scent can trick the users sense of taste allowing them to experience the sensation of flavor without the actual presence of a flavor additive in the liquid.

Antimicrobial Accessories

To prevent and lessen the build up and accumulation of harmful bacteria and biological contaminants. An embodiment of the smart hydration system where an antimicrobial additive is used in the material of a component or various components of the system. An embodiment of the cap system where the rubber bumper component (if applicable) has an antimicrobial additive in the material.

Variable Length Straw

A variable length straw 63 can allow the cap system to be easily compatible with different bottle and container sizes. A rigid straw comprising multiple interlinked segments that can telescope out to various lengths. A rigid straw comprising multiple segments that can link together via a connection feature wherein segments can be added or removed to achieve various lengths.

Smart Scale

To measure fluid removed or consumed. An embodiment of the smart hydration system wherein the bottle system is equipped with a scale connected to the microcontroller used to measure the amount of fluid removed from the system. This embodiment can describe both an attachment or an embedded system.

Glass-Like Bottle

To allow vessel contents to be visible and to improve liquid flavor. Also could lessen biological contaminant build up and accumulation within the vessel and improve vessel cleaning due to a smooth surface finish on the interior of the vessel. An embodiment of the bottle system wherein the vessel comprising the primary reservoir is made out of a durable glass-like substance. This embodiment can describe a single walled vessel, a vacuum insulated vessel, or any other relevant form of vessel.

Respiratory Monitoring Mask

To monitor and collect data for the respiratory system. A face mask consisting of a flowmeter sensor, microcontroller, communications radio, and battery. Wherein the flowmeter sensor is positioned such that it can monitor the inflow and outflow of respiratory gas which it can then relay to a companion device via the microcontroller and communications radio. This invention draws from many of the claims, technologies, and systems present in the smart hydration system.

Term Definitions

Smart Hydration System: refers to any specific embodiment, combination of embodiments and/or all defined embodiments of the smart cap invention disclosed in Bowles, U.S. Pat. No. 10,501,246 for a Smart Cap For A Liquid Container, which is hereby incorporated by reference in its entirety. When embodiments reference this term either directly or indirectly, they are intended to encompass all the relevant embodiments nested within. Meaning that an embodiment referencing this could be expanded into multiple embodiments with each embodiment referencing a specific nested embodiment.

Software Application: Refers to any specific embodiment, combination of embodiments and/or all defined embodiments of the software application. When embodiments reference this term either directly or indirectly, they are intended to encompass all the relevant embodiments nested within. Meaning that an embodiment referencing this could be expanded into multiple embodiments with each embodiment referencing a specific nested embodiment.

Cap System: Refers to any specific embodiment, combination of embodiments and/or all defined embodiments of the cap component of the Smart Hydration System.

Bottle System: Refers to any specific embodiment, combination of embodiments and/or all defined embodiments of the bottle component of the Smart Hydration System.

Wearable System: Refers to any specific embodiment, combination of embodiments and/or all defined embodiments of the wearable liquid vessel component of the Smart Hydration System (if applicable).

Hydration Algorithm: Refers to the algorithm used to calculate a users hydration status.

Companion Device: Refers to any peripheral device that the software application runs on.

Flow Path: Refers to a moving body of water with a forward direction, and describes but is not limited to: Straw; Through-hole from the interior to the exterior of the cap system.

Drink Type: A drink type can consist of but is not limited to: Water; Coffee; and Alcohol.

Drink Log: A drink log can consist of but is not limited to: Drink volume; Drink timestamp; Drink type; Drink duration; and Drink rate (volume/drink duration.

User Profile: The profile created by the user in the software application.

Personalized Enrichment Profile: A unique profile generated for a user based on but not limited to: Consumption behavior such as but not limited to Commonly consumed drink types, Common consumption times, and Favorite drink types; User profile data.

Actuator: Refers to a mechanism for controlling a physical element of a system which can be either electrical or mechanical in nature. It can describe a single input or an entire system. It can be a Button, Switch, Lever, Force sensor, Pressure or the like.

Battery: Refers to any component used to supply power to the system. Can describe both a non-rechargeable and rechargeable component, and describes but is not limited to a Lithium Ion or a Lithium Polymer.

Light Emitter: Refers to any component used to emit light within the system, and Describes but is not limited to: Light-emitting diode (LED), Incandescent, High-Intensity Discharge (HID), Compact Fluorescent, Linear Fluorescent, and Halogen.

Turbidity is the measure of the cloudiness of water. High levels of Turbidity mean the water quality is bad and contain a large of contaminants such as inorganic chemicals and microorganisms like bacteria, parasites, and viruses which can cause gastrointestinal illness such as nausea, vomiting, diarrhea, and cramps. (Max 1 NTU).

Water Hardness: Refer to the number of dissolved minerals in the water, mainly calcium and magnesium ions. Hard water can form scales in appliances, fixtures, and pipes which reduce the lifespan of appliances and clog the pipes. (Max 250 mg/L).

Enrichment Substance: Refers to any substance used for the purpose of enrichment or enhancement. Can describe a uniform substance or a mixture of various substances.

A safety switch in the cap that gets activated when the cap is removed from the bottle and it turns OFF the bacteria killing blue LED so it doesn't inadvertently hurt the user's eyes.

A connector rail/clip on the down straw that can receive/secure consumable modules/packets for alkaline beads, flavor packs, etc.

Using the same a connector rail/clip on the end of the down straw that receives and/or secures a ceramic or other types of filters for filtering water before it enters the straw. Note: the practical reality is that this feature will require the pump to force the water through the filter because it's too difficult for a person to suck enough to get water through the filter. So, this claim is in conjunction with the pump version.

A version of the product that has the existing features plus the pump. Another version with current features plus the bacteria killing blue LED. Another version that includes the current features plus the pump, plus the bacteria killing blue LED, plus the filter.

The use of the accelerometer to wake-up the systems when moved in order to save battery, turn on indicators, etc.

One embodiment is a smart cap 20 for a liquid container 25. The smart cap 20 comprises a rechargeable battery 42, a microcontroller 26 (with wireless transceiver/BTLE 28), a centrifuge pump 51 (micro motor 40 and impeller 35), and a plurality of LED light indicators 36a-d. The smart cap 20 optionally comprises an attachable hard-cover 24 for extra protection and personalization. The smart cap according optionally comprises a removable reservoir 32 for easy cleaning and replacement. The smart cap according optionally comprises a stretchable hose. The smart cap optionally comprises an adaptive gulp size.

Figure 25:
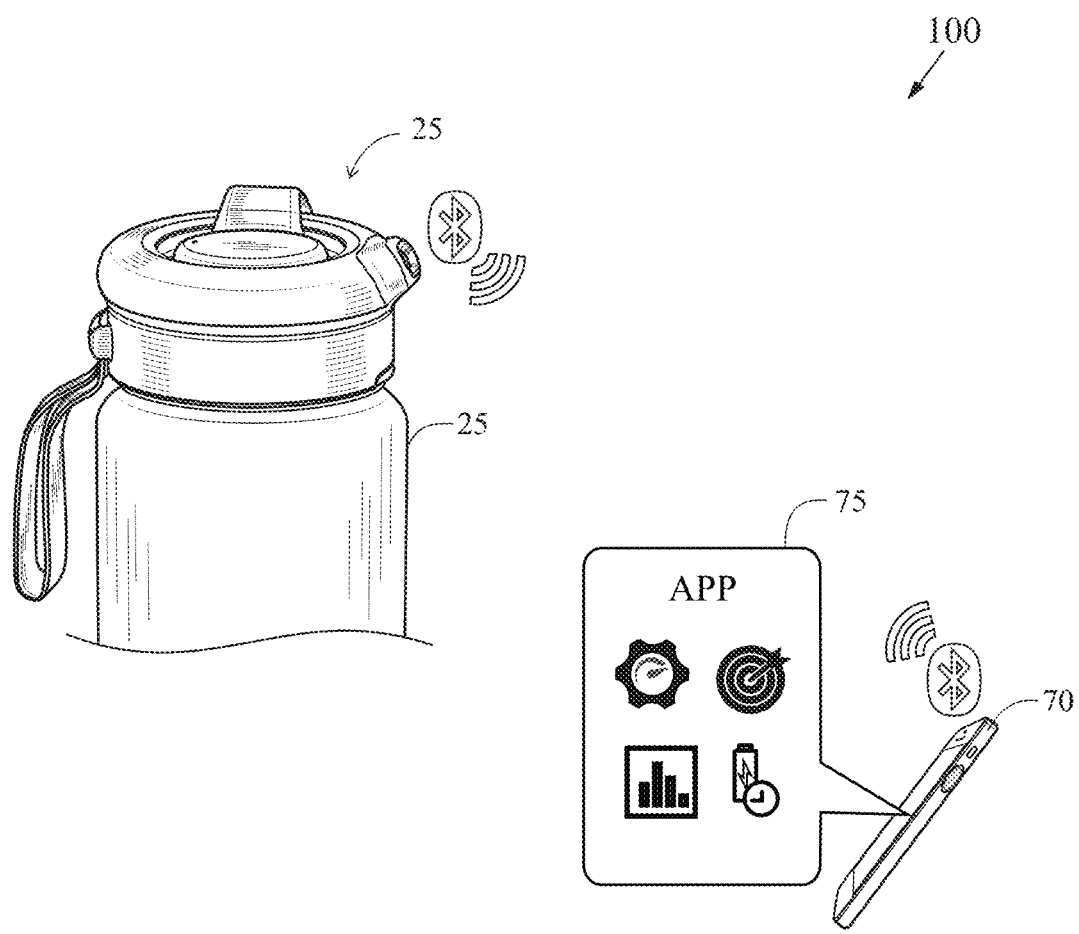
FIG. 25 is a block diagram of a system of a smart cap.

Another embodiment is a system 100, shown in FIG. 25, for a smart cap 20 for a liquid container 25. The system comprises a smart cap 20, a mobile application 75 for a mobile device 70, and a liquid container 25, wherein the smart cap 20 is attached to the liquid container 25. The mobile application 75 preferably comprises a hardware battery life, a daily goal tracking, a performance optimization, and a statistics view. A plurality of hardware settings preferably comprises burst volume, Bluetooth connections, tracking sensors, LED brightness, touch sensitivity and LED indicator notifications.

Yet another embodiment is a smart hydration system comprising a flowmeter 55 that allows the smart hydration system to monitor the volume of liquid that goes through the system, wherein the flowmeter is utilized to capture the users drink consumption data in the form of a drink log.

Yet another embodiment is a smart hydration system comprising a flowmeter 55 comprising a magnetic rotor 50 with hall effect sensor 5. The magnetic rotor 50 sits within the flow path 54 and rotates when liquid passes across the magnetic rotor. The Hall effect sensor 5 is located on the same plane as the magnetic rotor 50 and is positioned outside of the liquid flow path 54. The Hall effect sensor 5 detects the magnetic field oscillations created by the spinning rotor 50 allowing the microcontroller 26 to compute the rotation count and speed (revolutions/time) which can be used to calculate the volume of liquid that has passed through the flowmeter 55.

Yet another embodiment is a smart hydration system comprising a flowmeter comprising a 1-axis piezoelectric flex sensor. The flex sensor is embedded within the liquid flow path such that when liquid passes by it deflects the flex sensor in the direction of the liquid flow. The degree of deflection combined with the duration of the deflection are used to determine the volume of liquid that has passed through the flowmeter.

Yet another embodiment is a smart hydration system comprising a flowmeter comprising a laser emitter element and an optical sensor/receiver. The laser path is oriented perpendicular to and directly through the liquid flow path and the optical sensor/receiver is positioned on the opposite side of the liquid flow path across from the laser emitting element. The degree of the laser diffusion combined with the duration of the diffusion is used to determine the volume of liquid that has passed through the flowmeter.

The flowmeter is preferably one of an electromagnetic flowmeter; an ultrasonic flowmeter; a Coriolis flowmeter; a displacement flowmeter; a piezoelectric flex sensor flowmeter; a laser and optical sensor flowmeter; a water optimized vortex shedders flowmeter; a lubrication optimized vane/piston style flowmeter; a water optimized vane/piston style flowmeter; a variable area float flowmeter; a paddle wheel flowmeter; a laminar flow element flowmeter; a thermal flowmeter; a differential pressure flowmeter; a positive displacement flowmeter; a propeller flowmeter; a turbine flowmeter; or a magnetic rotor with hall effect sensor flowmeter.

Yet another embodiment is a smart hydration system comprising a smart cap system comprising an embedded optical sensor 60 located on the bottom side of the cap facing the interior of the bottle; wherein the optical sensor 60 can be controlled and interpreted via the systems microcontroller 26 and software application.

Yet another embodiment is a smart hydration system comprising a bottle system or wearable system with an embedded optical sensor located within the interior of the vessel; wherein the optical sensor can be controlled and interpreted via the systems microcontroller and software application.

Yet another embodiment is a smart hydration system comprising a cap system with an embedded PH sensor located 61 on the bottom side of the cap facing the interior of the bottle, wherein the PH sensor 61 can be controlled and interpreted via the systems microcontroller 26 and software application.

Yet another embodiment is a smart hydration system comprising a bottle system or wearable system with an embedded PH sensor located within the interior of the vessel, wherein the PH sensor can be controlled and interpreted via the systems microcontroller and software application.

Yet another embodiment is a smart hydration system comprising a cap system with an embedded electromagnetic sensor 67 located on the bottom side of the cap facing the interior of the bottle, wherein the electromagnetic sensor 67 can be controlled and interpreted via the systems microcontroller 26 and software application.

Yet another embodiment is a smart hydration system comprising a bottle system or wearable system with an embedded electromagnetic sensor located within the interior of the vessel, wherein the electromagnetic sensor can be controlled and interpreted via the systems microcontroller and software application.

Yet another embodiment is a smart hydration system comprising a bottle system or wearable system with an embedded micro blower pump used to store pressure within the fluid container, wherein the actuator triggers the release valve to allow fluid to be expelled via displacement from the bottle, wherein the actuator is either electrically or mechanically driven, comprising a micro blower pump, a battery, a capacitive charger (optional), an one-way valve, an internal pressure sensor (optional), the actuator, and a release valve that is either a binary state or variable state release valve.

Yet another embodiment is a smart hydration system comprising a bottle system or wearable system that uses a button to trigger a diaphragm pump to displace fluid from within the fluid vessel through the drinking nozzle; wherein the pump does not require a release valve at the location where the fluid is expelled, wherein the pump does not deal with a stored pressure which may reduce the engineering burden and system complexity; wherein the system comprises a diaphragm pump, a battery, a capacitive charger (optional), an one-way valve, a pressure sensor, and an actuator.

Yet another embodiment is a smart hydration system comprising a cap system with an embedded ultraviolet light emitter 68 located on the bottom side of the cap facing the interior of the bottle, wherein a UV light emitter 68 is controlled via the systems microcontroller 26 and software application.

Yet another embodiment is a smart hydration system comprising a bottle system with an embedded ultraviolet light emitter located on the bottom side of the cap facing the interior of the bottle, wherein a UV light emitter is controlled via the systems microcontroller and software application.

Yet another embodiment is a smart hydration system comprising a cap system with an embedded ultraviolet light emitter located somewhere along the fluid flow path. The UV light emitter is controlled via the systems microcontroller and software application. The UV light is focused with greater intensity on a smaller volumetric area along the flow path allowing for a faster rate of purification. The UV light emitter is dynamically turned on based on when fluid is actively flowing through the system.

Yet another embodiment is a smart hydration system comprising a light indicator area 48 on a cap system is replaced by or used in conjunction with a digital display and/or touch input element, wherein the digital display is one following technologies: LCD; LED; OLED; and E-Ink.

Yet another embodiment is a smart hydration system comprising a bottle system is equipped with an embedded digital display and/or touch input element, wherein a flexible display technology allows the display to wrap around a cylindrical bottle, wherein the digital display is one of the following technologies: LCD; LED; OLED; and E-Ink.

Yet another embodiment is a smart hydration system comprising a smart hydration system wherein the bottle system is equipped with an embedded microphone that is connected to the systems microcontroller, wherein the system is programmed with specific wake word commands that can be used to control and input information.

Yet another embodiment is a smart hydration system comprising a filtration element placed within the flow path such that when liquid passes through the flow path, it is forced through the filter element.

Yet another embodiment is a smart hydration system comprising a reservoir containing an enrichment substance is located perpendicular to the flow path; wherein the reservoir containing the enrichment substance has a through-hole containing a one-way valve that allows flow from the exterior of the reservoir into the interior of the reservoir; wherein a second through-hole containing a one-way valve connects the reservoir containing the enrichment substance to the interior of the flow path allowing the enrichment substance to flow from the reservoir into the flow path; wherein the Venturi effect pulls the enrichment substance from the reservoir into the flow path; wherein when liquid is moving through the flow path it creates an area of low pressure within the flow path; wherein the Venturi effect causes the enrichment concentrate to move from the relative high pressure area of the reservoir to the relative low pressure area of the connected flow path.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A system for a smart cap for a liquid container, the system comprising:
    a cap comprising a housing, a battery, a microcontroller with a wireless transceiver, a straw coupling, a straw connected to the straw coupling, and a flowmeter, the flowmeter comprising a magnetic rotor with a Hall effect sensor in communication with the microcontroller, wherein the magnetic rotor sits within a liquid flow path of the straw and rotates when liquid passes across the magnetic rotor wherein the Hall effect sensor is located on a same plane as the magnetic rotor and is positioned outside of the liquid flow path;
    a mobile device comprising a mobile application; and
    a liquid container configured to contain a liquid, wherein the cap is attached to the liquid container;
    wherein the Hall effect sensor detects the magnetic field oscillations created by a spinning rotor allowing the microcontroller to compute a rotation count and a speed (revolutions/time) which can be used to calculate a volume of liquid that has passed through the flowmeter;
    wherein the wireless transceiver of the microcontroller transmits the volume of liquid that has passed through the flowmeter to the mobile application;
    wherein the mobile application is configured to utilize the volume of liquid for at least one of daily goal tracking, a performance optimization or a drink log.

2. The system according to claim 1 wherein the cap comprises an embedded pH sensor located on a bottom side of the cap facing the interior of the liquid container, wherein the pH sensor is configured to be controlled and interpreted via the microcontroller and a software application.

3. The system according to claim 1 further comprising:
    an embedded micro blower pump used to store pressure within the fluid container, wherein an actuator triggers a release valve to allow fluid to be expelled via displacement from the liquid container, wherein the actuator is either electrically or mechanically driven, comprising a battery, and a one-way valve, and the release valve is either a binary state or variable state release valve.

4. The system according to claim 1 further comprising:
    an embedded ultraviolet light emitter located on the bottom side of the cap facing the interior of the liquid container, wherein the UV light emitter is controlled via the microcontroller.

5. The system according to claim 1 further comprising:
    an embedded ultraviolet light emitter located along a fluid flow path;
    wherein the UV light emitter is controlled via the microcontroller;
    wherein the UV light is focused on a volumetric area along the flow path allowing for purification;
    wherein the UV light emitter is dynamically turned on based on when fluid is actively flowing through the system.

6. The system according to claim 1 further comprising:
    a filtration element placed within a flow path such that when liquid passes through the flow path, the liquid is forced through the filter element.

* * * * *